US009551360B2

(12) United States Patent
Hillesheim et al.

(10) Patent No.: US 9,551,360 B2
(45) Date of Patent: Jan. 24, 2017

(54) HYDRAULIC ACCUMULATOR

(75) Inventors: Thorsten Hillesheim, Remagen (DE); Franz-Josef Peterschilka, Sinzig (DE); Frank Stubenrauch, Koblenz (DE); Viktor Bauer, Bornheim (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 14/358,773

(22) PCT Filed: Jun. 14, 2012

(86) PCT No.: PCT/EP2012/002509
§ 371 (c)(1), (2), (4) Date: May 16, 2014

(87) PCT Pub. No.: WO2013/071985
PCT Pub. Date: May 23, 2013

(65) Prior Publication Data

US 2014/0318655 A1 Oct. 30, 2014

(30) Foreign Application Priority Data

Nov. 17, 2011 (EP) .................................... 11009128

(51) Int. Cl.
*F16L 55/04* (2006.01)
*F15B 1/02* (2006.01)
(Continued)

(52) U.S. Cl.
CPC ................ *F15B 1/02* (2013.01); *B21D 26/14* (2013.01); *B21D 39/046* (2013.01); *F15B 1/106* (2013.01);
(Continued)

(58) Field of Classification Search
CPC ........................................................ F15B 1/02
(Continued)

(56) References Cited

U.S. PATENT DOCUMENTS 3,315 A * 10/1843 Allen ............................. 138/30
2,339,876 A * 1/1944 Phillips .................. F15B 1/125 138/30
(Continued)

FOREIGN PATENT DOCUMENTS

DE 102009021463 11/2010
EP 0007970 A1 2/1980
(Continued)

*Primary Examiner* — Paul R Durand
*Assistant Examiner* — Vishal Pancholi
(74) *Attorney, Agent, or Firm* — Fraser Clemens; Martin & Miller LLC; James D. Miller

(57) ABSTRACT

A hydraulic accumulator, comprising a base body (2*a*, 2*b*, 2*c*, 2*d*, 2*e*, 2*f*, 2*g*, 2*h*, 2*i*) having a first component (3*a*, 3*b*, 3*c*, 3*d*, 3*e*, 3*f*, 3*g*, 3*h*, 3*i*) and a second component (4*a*, 4*b*, 4*c*, 4*d*, 4*e*, 4*f*, 4*g*, 4*h*, 4*i*) which are connected to one another by a form fit and/or a material join, is, with the aim of specifying a hydraulic accumulator which, after fabrication without difficulty, exhibits a very reliable seal, a high level of strength, an as far as possible undamaged surface and an as far as possible rotationally symmetrical design in the joining region of the components, characterized in that at least one component (3*a*, 3*b*, 3*c*, 3*d*, 3*e*, 3*f*, 3*g*, 3*h*, 3*i*, 4*a*, 4*b*, 4*c*, 4*d*, 4*e*, 4*f*, 4*g*, 4*h*, 4*i*) is deformed by a contactless shaping method in such a way that it enters into the form fit and/or material join with the other component (3*a*, 3*b*, 3*c*, 3*d*, 3*e*, 3*f*, 3*g*, 3*h*, 3*i*, 4*a*, 4*b*, 4*c*, 4*d*, 4*e*, 4*f*, 4*g*, 4*h*, 4*i*).

17 Claims, 9 Drawing Sheets

(51) Int. Cl.
*B21D 26/14* (2006.01)
*F15B 1/10* (2006.01)
*B21D 39/04* (2006.01)

(52) U.S. Cl.
CPC .. *F15B 2201/205* (2013.01); *F15B 2201/3151* (2013.01); *F15B 2201/3156* (2013.01); *F15B 2201/4056* (2013.01); *F15B 2201/605* (2013.01)

(58) Field of Classification Search
USPC .............................................................. 138/30
See application file for complete search history.

(56) References Cited

U.S. PATENT DOCUMENTS

| | | | | | |
|---|---|---|---|---|---|
| 2,924,359 | A | * | 2/1960 | Beremand | 222/386.5 |
| 3,066,699 | A | * | 12/1962 | Peet | F15B 1/106 122/35 |
| 3,368,586 | A | * | 2/1968 | French | F15B 1/14 138/30 |
| 3,397,719 | A | | 8/1968 | Ortheil | |
| 3,627,612 | A | | 12/1971 | Greer | |
| 4,077,100 | A | * | 3/1978 | Zahid | F15B 1/125 138/30 |
| 4,234,016 | A | * | 11/1980 | Horino | 138/30 |
| 4,321,949 | A | * | 3/1982 | Mercier | 138/30 |
| 4,452,276 | A | | 6/1984 | Hozumi et al. | |
| 4,543,997 | A | * | 10/1985 | Kishimoto | 138/30 |
| 5,671,522 | A | | 9/1997 | Aronne | |
| 5,979,694 | A | | 11/1999 | Bennett et al. | |
| 6,092,552 | A | * | 7/2000 | Takamatsu et al. | 138/30 |
| 6,379,254 | B1 | | 4/2002 | Yablochnikov | |
| 6,779,550 | B1 | | 8/2004 | Bennett et al. | |
| 2007/0029326 | A1 | * | 2/2007 | Gafri | B23K 13/01 220/309.1 |
| 2008/0264130 | A1 | | 10/2008 | Blakely et al. | |

FOREIGN PATENT DOCUMENTS

| | | | |
|---|---|---|---|
| EP | 1431073 | A2 | 6/2004 |
| FR | 1307091 | A | 10/1962 |
| FR | 2632218 | A1 | 12/1989 |
| GB | 1231436 | A | 5/1971 |
| WO | 0181021 | A2 | 11/2001 |
| WO | 2005002777 | A1 | 1/2005 |
| WO | 2010130332 | A1 | 11/2010 |

* cited by examiner

HYDRAULIC ACCUMULATOR

CROSS-REFERENCE TO RELATED APPLICATIONS

This application is a United States national phase application based on PCT/EP2012/002509 filed Jun. 14, 2012 which claims the benefit of European Patent Application Serial No. 11009128.7 filed Nov. 17, 2011. The entire disclosures of the above applications are hereby incorporated herein by reference.

TECHNICAL BACKGROUND

The invention relates to a hydraulic accumulator according to the preamble of patent claim 1.

PRIOR ART

Hydraulic accumulators, in particular diaphragm accumulators, can be used in hydraulic systems for storing energy. The hydraulic accumulators are pressure containers having receptacle spaces in which a specific usable volume of a liquid medium can be stored. The compressibility of a gaseous medium is used to apply pressure to the liquid medium.

In a diaphragm accumulator, a diaphragm usually divides off a receptacle space, in which the liquid medium can be accommodated, from a storage space. A gaseous, compressible medium is accommodated in the storage space. The receptacle space in which the liquid medium is accommodated can be connected to a hydraulic circuit.

As soon as the liquid medium is pressed under pressure into the diaphragm so accumulator, the gaseous medium in the storage space is compressed. In the case of a drop in pressure in the hydraulic circuit, the compressed gaseous medium can expand and can force the liquid medium accommodated in the receptacle space back into the hydraulic circuit.

A currently commercially available diaphragm accumulator is generally composed of two housing shells in which a diaphragm is mounted using a clamping ring. The mounting of the clamping ring is carried out in manufacturer-specific fashion.

After this, the two housing shells are closed off using a welding method. Furthermore, the diaphragm accumulator is filled with a gas via an inflow line. The storage space of the diaphragm accumulator which contains the gas is then closed off.

Against this background, WO 2010/130 332 A1 has already disclosed a diaphragm accumulator which comprises as components two housing shells which are connected to one another with a form fit.

The form fit is manufactured by shaping at least one of the components. In this context, tools usually act with considerable forces on the components. These tools can lead to damage to the outer surface of the components. Specifically, scratches, dents or scuffing can occur. Furthermore, joining with a form fit is difficult to implement within a pressure chamber.

When a form fit is manufactured on a hydraulic accumulator, it is necessary, owing to its substantially rotationally symmetrical design, that identical forces act in the radial direction in order to prevent non-uniform deformation.

In production it may easily be the case that the tools which act on the components bring about non-uniform and "non-round" deformation of the components. In this respect, a type of geometric unbalance may be impressed on a hydraulic accumulator. This can lead, in particular, to problems with respect to the seal and/or the strength.

SUMMARY OF THE INVENTION

The invention is therefore based on the object of specifying a hydraulic accumulator which, after fabrication without difficulty, exhibits a very reliable seal, a high level of strength, an as far as possible undamaged surface and an as far as possible rotationally symmetrical design in the joining region of the components.

According to the invention, the above object is achieved by means of a hydraulic accumulator having the features of patent claim 1.

According to the invention it has been recognized that a contactless shaping method can ensure that the external surface of the hydraulic accumulator remains substantially undamaged. The external surface of the hydraulic accumulator is free of dents, scratches or other irregularities. Furthermore, it has been recognized that such a shaping method allows forces to act uniformly on a rotationally symmetrical component of the hydraulic accumulator in such a way that it is deformed uniformly without unbalance in the radial direction.

Moreover, such a shaping method can apply such a prestress to a sealing surface of the diaphragm that it is possible to dispense with a clamping ring. The shaping method reduces the parts and the mounting steps which are necessary to fabricate a hydraulic accumulator, in particular a diaphragm accumulator.

In this respect, a hydraulic accumulator is specified which, after fabrication without difficulty, exhibits a very reliable seal, a high level of strength, an as far as possible undamaged surface and an as far as possible rotationally symmetrical design in the joining region of the components.

Consequently, the object mentioned at the beginning is achieved.

The shaping method could be an electromagnetic pulse joining operation. The Lorentz force which acts on a conductor through which a current flows in a magnetic field can advantageously be used for joining with a form fit. This force is surprisingly strong and precise to the extent that a metallic component with a considerable wall thickness can be deformed in a defined and uniform fashion. A metallic component can be surprisingly bent or pressed onto another component in the radial direction, as it were shrunk on. The forces which arise act on the hydraulic accumulator along the circumference thereof in a uniformly radial fashion in such a way that the components can be connected to one another in a fluidtight fashion with a form fit and/or material join.

The components could also be connected to one another in a materially joined fashion. In addition to the form fit, a material join could also be provided in order to further increase the seal of the hydraulic accumulator.

At least one component could be fabricated from a metal. Metals can be joined by an electromagnetic pulse joining operation owing to their electrical conductivity. In particular, all the electrically conductive iron metals and non-iron metals can be joined.

Against this background, at least one component could be fabricated from aluminum. By means of the contactless shaping method, this material, which per se can only be welded at high cost, is used for the manufacture of hydraulic accumulators, in particular diaphragm accumulators. Furthermore, at least one component could be fabricated from steel. The steel could be cold formed.

A component could be fabricated from plastic. In this context it is conceivable to use thermoplasts or duroplasts. A reduction in weight of the hydraulic accumulator is possible in this way. The fixed or static component during the electromagnetic pulse joining operation can be fabricated from plastic, while the other component is fabricated from a metal.

The components could form a storage space for a gaseous medium and a receptacle space for a liquid medium, wherein the storage space is separated off from the receptacle space by a diaphragm, and wherein the volumes of the storage space and of the receptacle space are variable. The hydraulic accumulator can therefore function as a diaphragm accumulator. The diaphragm can advantageously form sealing faces with the components by being clamped in between them under prestress. It is possible to dispense with a clamping ring for the diaphragm.

The storage space could be embodied without an inflow line. It is therefore possible to fabricate a compact hydraulic accumulator, which is provided with as few cumbersome connections as possible. Such a hydraulic accumulator has closure of the storage space with a high level of process reliability. The hydraulic accumulator can be joined in an installation space under pressure. The pressure in the installation space then corresponds substantially to the pressure in the storage space in the unloaded state of the hydraulic accumulator.

The receptacle space could have a connector which is integrally formed onto a first component. The connector is advantageously embodied as a hexagon and therefore permits the hydraulic accumulator to be easily connected by flanges to a hydraulic system.

The storage space could have an inflow line which is integrally formed onto a second component. By virtue of this configuration, the pressure in the storage space can be adjusted by refilling.

A first component could be embodied as a housing lower shell and a second component as a housing upper shell, wherein the edges of the housing lower shell and of the housing upper shell overlap one another and clamp in a diaphragm between them. The hydraulic accumulator can therefore function as a diaphragm accumulator. The diaphragm can advantageously form sealing faces with the components by being clamped in between them under prestress. It is possible to dispense with a clamping ring for the diaphragm.

A method for fabricating a hydraulic accumulator of the type described here could use an electromagnetic pulse joining operation as a shaping method.

In order to avoid repetitions with respect to the advantages of the contactless shaping method, reference is made to the statements relating to the hydraulic accumulator as such.

A system for carrying out an electromagnetic pulse joining operation is composed essentially of a pulse generator and a tool coil.

The pulse generator generates an electric current which flows through the tool coil. In this context, a magnetic field is generated which in turn induces a current in a component made of electrically conductive material.

What are referred to as Lorentz forces act on bodies through which a current flows in magnetic fields. These forces can, given sufficient strength, plastically deform the component and fit snugly onto another component or be integrally formed thereon. This shaping method is contactless and does not damage the surfaces of the components.

Moreover, this shaping method can also manufacture a materially joined connection between two components without the components being fused on. Metals can be moved close to one another in such a way that electrons can be exchanged between them.

Against this background, a first component could be made available, a diaphragm or a sealing means could be arranged between the first component and a second component, and the second component and/or the first is component could be deformed by the shaping method. By virtue of such a method it is possible to dispense with welding processes.

The diaphragm or the sealing means could be placed under prestress without using a damping ring by deforming one of the components. In this way it is possible to achieve a saving in terms of components. A prestress can specifically be applied to the sealing bead of a diaphragm by deforming a housing lower shell during a joining process.

The hydraulic accumulator could be joined together by the shaping method in an installation space in which there is a pressure which is above or below the atmospheric pressure.

This method for manufacturing a hydraulic accumulator is advantageously carried out in an installation space in which a pressurized gas is accommodated. The gas which is to be accommodated in the storage space is present in the installation space.

It is therefore possible to dispense with inflow lines to the storage space. An inert gas is preferably used as the gas. The pressure which is clearly above atmospheric pressure and which is present in the installation space can be adjusted as a function of the purpose of use of the hydraulic accumulator.

EMBODIMENT OF THE INVENTION

Figure 1:
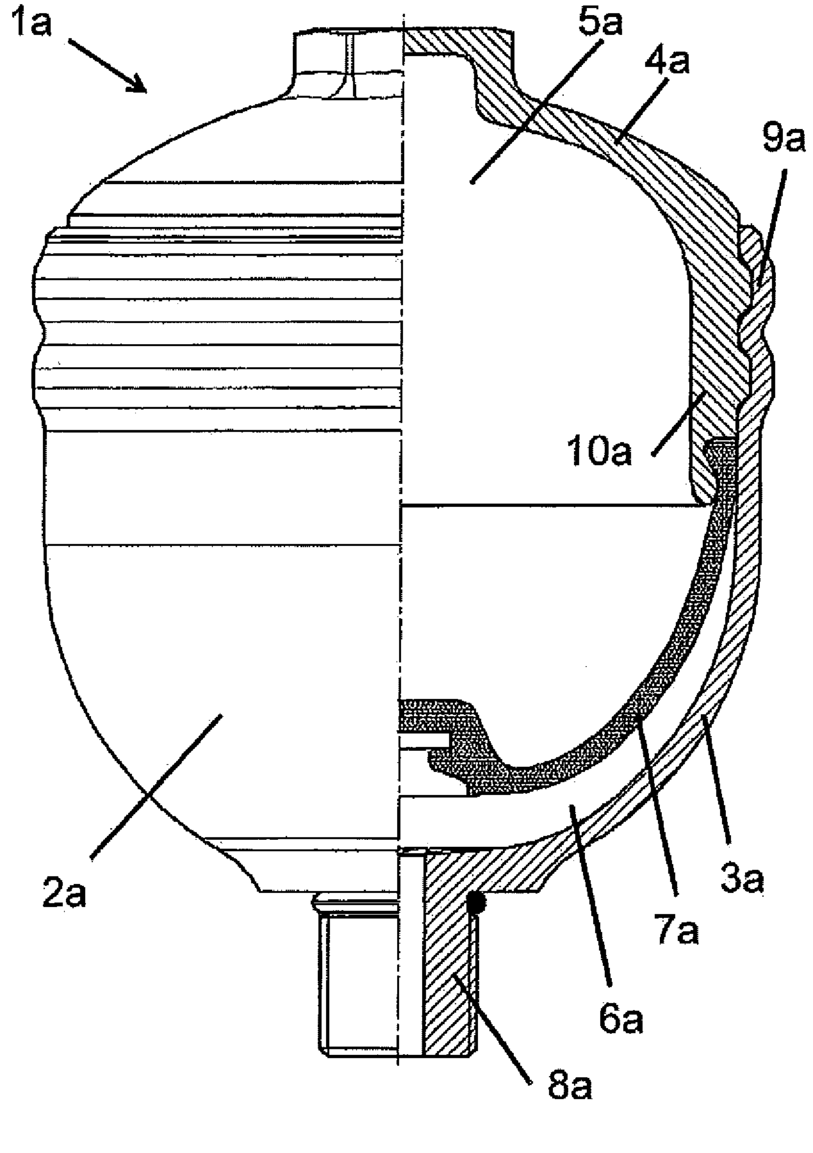
FIG. 1 shows a hydraulic accumulator which is embodied as a diaphragm accumulator and has two components which are connected to one another with a form fit and/or a material join, wherein a wave structure is impressed on the housing lower shell in the joining region.

In the drawing, FIG. 1 shows a hydraulic accumulator 1*a* comprising a base body 2*a* with a first component 3*a* and a second component 4*a* which are connected to one another by a form fit and/or material join.

At least one component, specifically the first component 3*a*, is deformed by a contactless shaping method such that it enters into the form fit and/or material join with the other component 4*a*.

A wave structure is formed in the first component 3*a*, said wave structure being made complementary to elevated portions and depressions in the second component 4*a*.

The shaping method which has been used to produce the form fit and/or material join is an electromagnetic pulse joining operation.

The first component 3*a* is fabricated from aluminum or steel.

The components 3*a*, 4*a* form a storage space 5*a* for a gaseous medium and a receptacle space 6*a* for a liquid medium, wherein the storage space 5*a* is separated off from the receptacle space 6*a* by a diaphragm 7*a*, and wherein the volumes of the storage space 5*a* and of the receptacle space 6*a* are variable. The diaphragm 7*a* is accommodated between the components 3*a*, 4*a* without a clamping ring.

The storage space 5*a* is embodied without an inflow line. The receptacle space 6*a* has a connector 8*a* which is integrally formed onto the first component 3*a*.

The first component 3*a* is embodied as a housing lower shell and the second component 4*a* as a housing upper shell, wherein the edges 9*a*, 10*a* of the housing lower shell or housing upper shell overlap one another and clamp in the diaphragm 7*a* between them. There is no clamping ring provided for the diaphragm 7*a*.

The housing upper shell is provided with grooves. The diaphragm 7*a* is arranged between the housing upper shell and the housing lower shell. The joined-together hydraulic accumulator la withstands a defined burst pressure. Furthermore, it is gastight and oiltight. The fitting of the housing lower shell into the grooves of the housing upper shell occurs by partially reducing the diameters of the housing lower shell.

Figure 2:
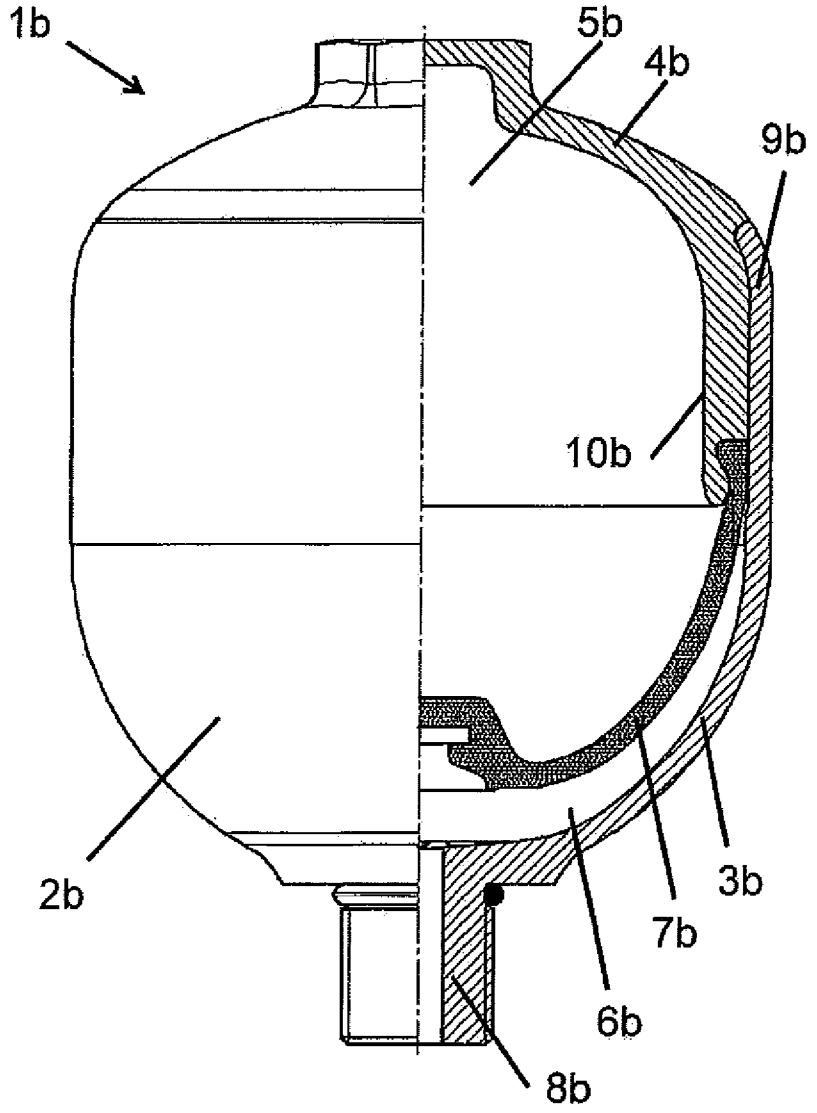
FIG. 2 shows a further hydraulic accumulator which is embodied as a diaphragm accumulator and has two components which are connected to one another with a form fit and/or a material join, wherein the upper edge of the housing lower shell is bent radially inward in the joining region.

In the drawing, FIG. 2 shows a hydraulic accumulator lb comprising a base body 2*b* with a first component 3*b* and a second component 4*b* which are connected to one another by a form fit.

At least one component, specifically the first component 3*b*, is deformed by a contactless shaping method such that it enters into the form fit with the other component 4*b*.

The shaping method which has been used to manufacture the form fit is an electromagnetic pulse joining operation.

The first component 3*b* is fabricated from aluminum or steel.

The components 3*b*, 4*b* form a storage space 5*b* for a gaseous medium and a receptacle space 6*b* for a liquid medium, wherein the storage space 5*b* is separated off from the receptacle space 6*b* by a diaphragm 7*b*, and wherein the volumes of the storage space 5*b* and of the receptacle space 6*b* are variable.

The storage space 5*b* is embodied without an inflow line. The receptacle space 6*b* has a connector 8*b* which is integrally formed onto the first component 3*b*.

The first component 3*b* is embodied as a housing lower shell and the second component 4*b* as a housing upper shell, wherein the edges 9*b*, 10*b* of the housing lower shell and housing upper shell overlap one another and clamp in the diaphragm 7*b* between them. There is no clamping ring provided for the diaphragm 7*b*.

The edge 9*b*, directed toward the second component 4*b*, of the first component 3*b* is bent radially inward and in the process engages over a circumferential, arcuate shoulder of the second component 4*b*.

Figure 3:
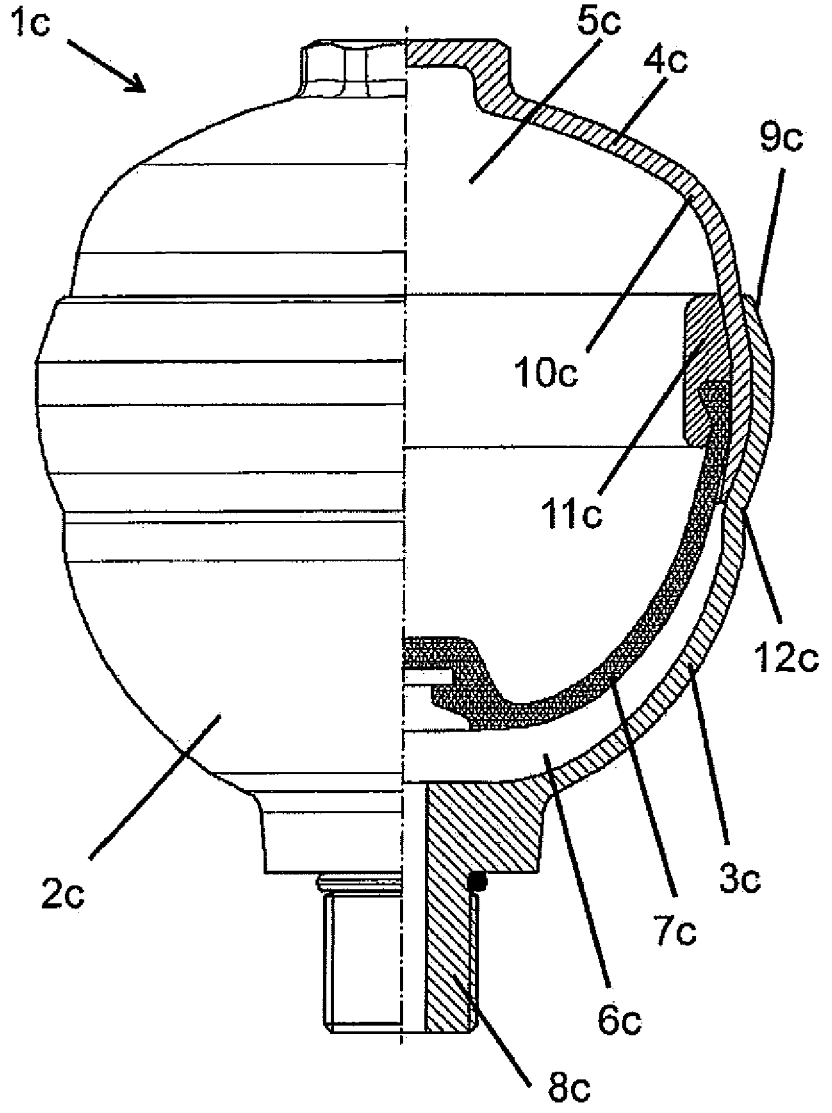
FIG. 3 shows a further hydraulic accumulator which is embodied as a diaphragm accumulator and has two components which are connected to one another with a form fit and/or a material join, wherein the edges of the housing lower shell and of the housing upper shell overlap one another in the joining region, and wherein a clamping ring is provided for the diagram.

In the drawing, FIG. 3 shows a hydraulic accumulator 1*c* comprising a base body 2*c* with a first component 3*c* and a second component 4*c* which are connected to one another by a form fit.

At least one component, specifically the first component 3*c*, is deformed by a contactless shaping method such that it enters into the form fit with the other component 4*c*.

The shaping method, which was used to manufacture the form fit, is an electromagnetic pulse joining operation.

The first component 3*c* is fabricated from aluminum or steel.

The components 3*c*, 4*c* form a storage space 5*c* for a gaseous medium and a receptacle space 6*c* for a liquid medium, wherein the storage space 5*c* is separated off from the receptacle space 6*c* by a diaphragm 7*c*, and wherein the volumes of the storage space 5*c* and of the receptacle space 6*c* are variable.

The storage space 5*c* is embodied without an inflow line. The receptacle space 6*c* has a connector 8*c* which is integrally formed onto the first component 3*c*.

The first component 3*c* is embodied as a housing lower shell and the second component 4*c* as a housing upper shell, wherein the edges 9*c*, 10*c* of the housing lower shell and of the housing upper shell overlap one another and clamp in the diaphragm 7*c*. A clamping ring 11 c is provided for the diaphragm 7*c*.

The diaphragm 7*c* is pressed between the clamping ring 11 c and the edge 10*c* of the second component 4*c*. The edge 9*c* of the first component 3*c* has a radially inwardly directed constriction 12*c*.

Figure 4:
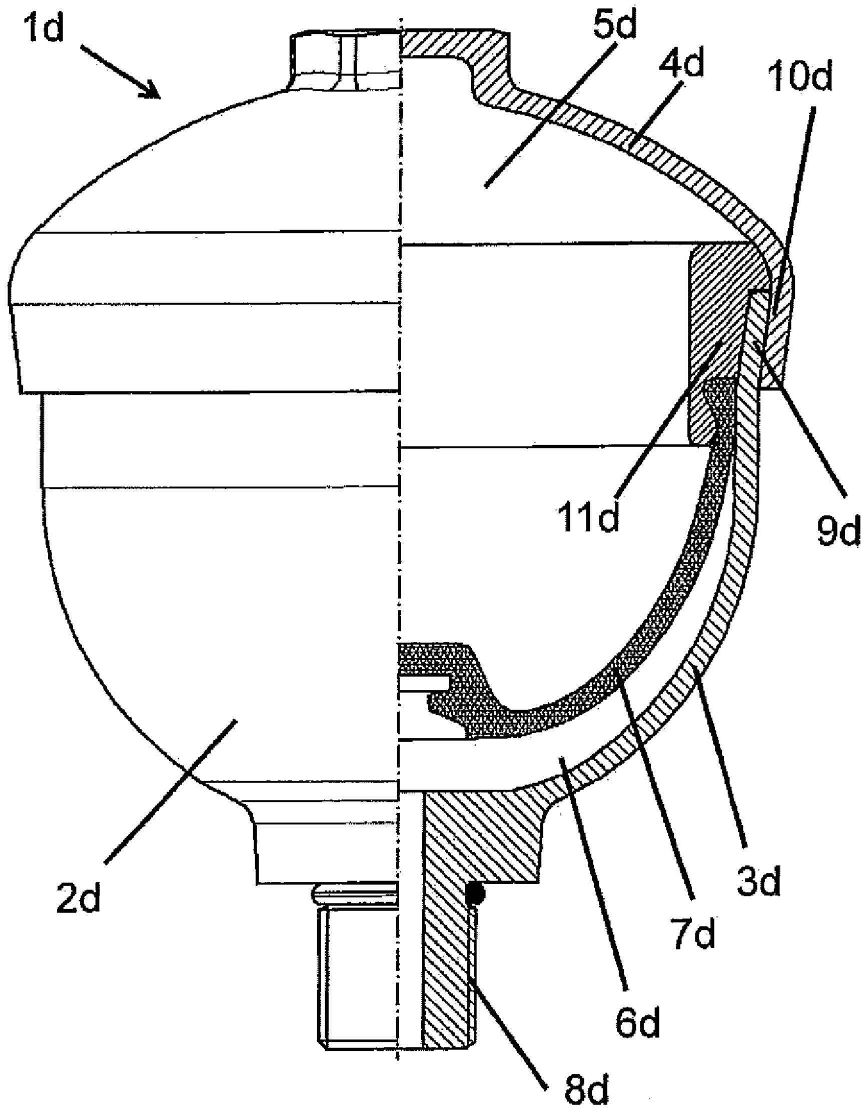
FIG. 4 shows a further hydraulic accumulator which is embodied as a diaphragm accumulator and has two components which are connected to one another with a form fit and/or a material join, wherein the edges of the housing lower shell and of the housing upper shell overlap one another in the joining region, wherein a clamping ring is provided and wherein the housing upper shell is deformed by means of the shaping method.

In the drawing, FIG. 4 shows a hydraulic accumulator 1*d* comprising a base body 2*d* with a first component 3*d* and a second component 4*d* which are connected to one another by a form fit.

At least one component, specifically the second component 4*d*, is deformed by a contactless shaping method in such a way that it enters into the form fit with the other component 3*d*.

The shaping method which was used to manufacture the form fit is an electromagnetic pulse joining operation.

The second component 4*d* is fabricated from aluminum or steel.

The components 3*d*, 4*d* form a storage space 5*d* for a gaseous medium and a receptacle space 6*d* for a liquid medium, wherein the storage space 5*d* is separated off from the receptacle space 6*d* by a diaphragm 7*d*, and wherein the volumes of the storage space 5*d* and of the receptacle space 6*d* are variable.

The storage space 5*d* is embodied without an inflow line. The receptacle space 6*d* has a connector 8*d* which is integrally formed onto the first component 3*d*.

The first component 3*d* is embodied as a housing lower shell and the second component 4*d* as a housing upper shell, wherein the edges 9*d*, 10*d* of the housing lower shell and of the housing upper shell overlap one another and clamp in the diaphragm 7*d*. A clamping ring lid is provided for the diaphragm 7*d*.

The clamping ring 11*d* engages over the edge 9*d* of the first component 3*d*, projects into it and tapers in the direction of the receptacle space 6*d*. The edge 10*d* of the second component 4*d* is bent radially inward and is pressed, together with the edge 9*d* of the first component 3*d*, against the clamping ring 11*d*. The diaphragm 7*d* is pressed here between the clamping ring 11*d* and the edge 9*d* of the first component 3*d*.

Figure 5:
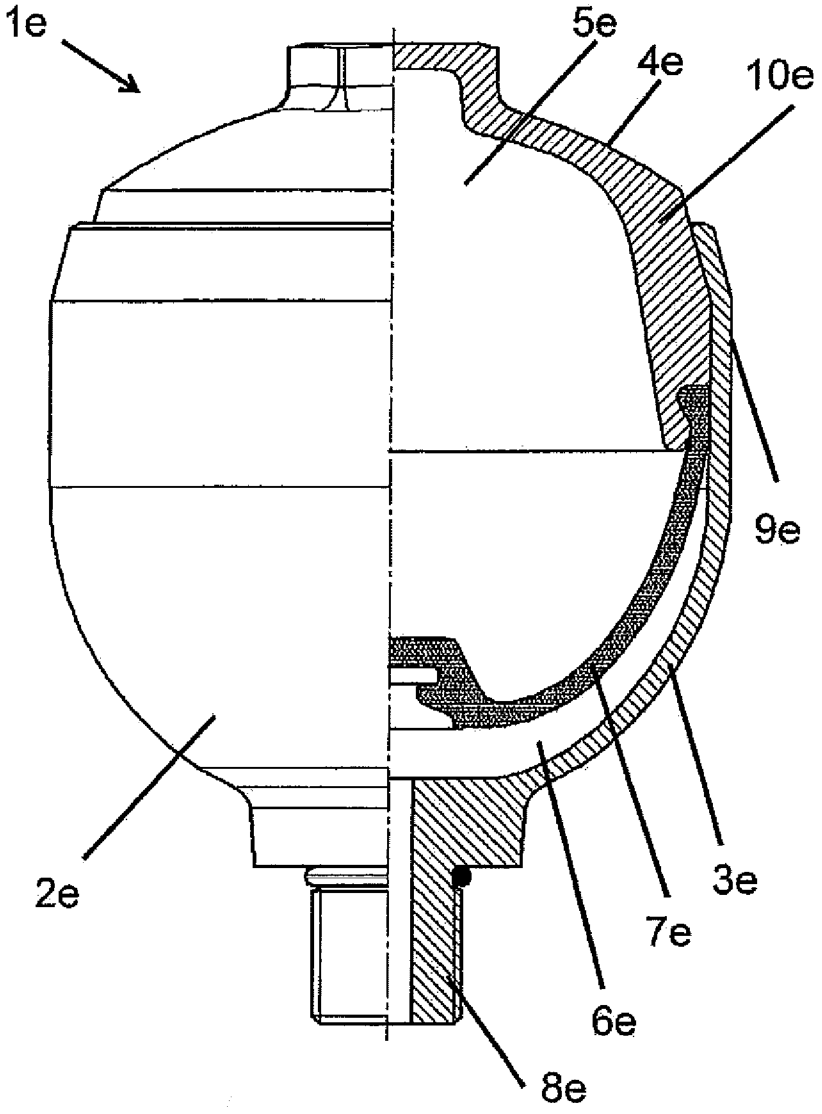
FIG. 5 shows a further hydraulic accumulator which is embodied as a diaphragm accumulator and has two components which are connected to one another with a form fit and/or a material join, wherein the edges of the housing lower shell and of the housing upper shell overlap one another in the joining region and wherein the housing upper shell has an edge with a relatively large wall thickness.

In the drawing, FIG. 5 shows a hydraulic accumulator 1*e* comprising a base body 2*e* with a first component 3*e* and a second component 4*e* which are connected to one another by a form fit.

At least one component, specifically the first component 3*e*, is deformed by a contactless shaping method in such a way that it enters into the form fit with the other component 4*e*.

The shaping method which was used to manufacture the form fit is an electromagnetic pulse joining operation.

The first component 3*e* is fabricated from aluminum or steel.

The components 3*e*, 4*e* form a storage space 5*e* for a gaseous medium and a receptacle space 6*e* for a liquid medium, wherein the storage space 5*e* is separated off from the receptacle space 6*e* by a diaphragm 7*e*, and wherein the volumes of the storage space 5*e* and of the receptacle space 6*e* are variable.

The storage space 5*e* is embodied without an inflow line. The receptacle space 6*e* has a connector 8*e* which is integrally formed onto the first component 3*e*.

The first component 3*e* is embodied as a housing lower shell and the second component 4*e* as a housing upper shell, wherein the edges 9*e*, 10*e* of the housing lower shell and of the housing upper shell overlap one another and clamp in the diaphragm 7*e* between them. There is no clamping ring provided for the diaphragm 7*e*. The diaphragm 7*e* projects with a bead in a positively locking fashion into a hollow in the edge 10*e* of the second component 4*e*.

Figure 6:
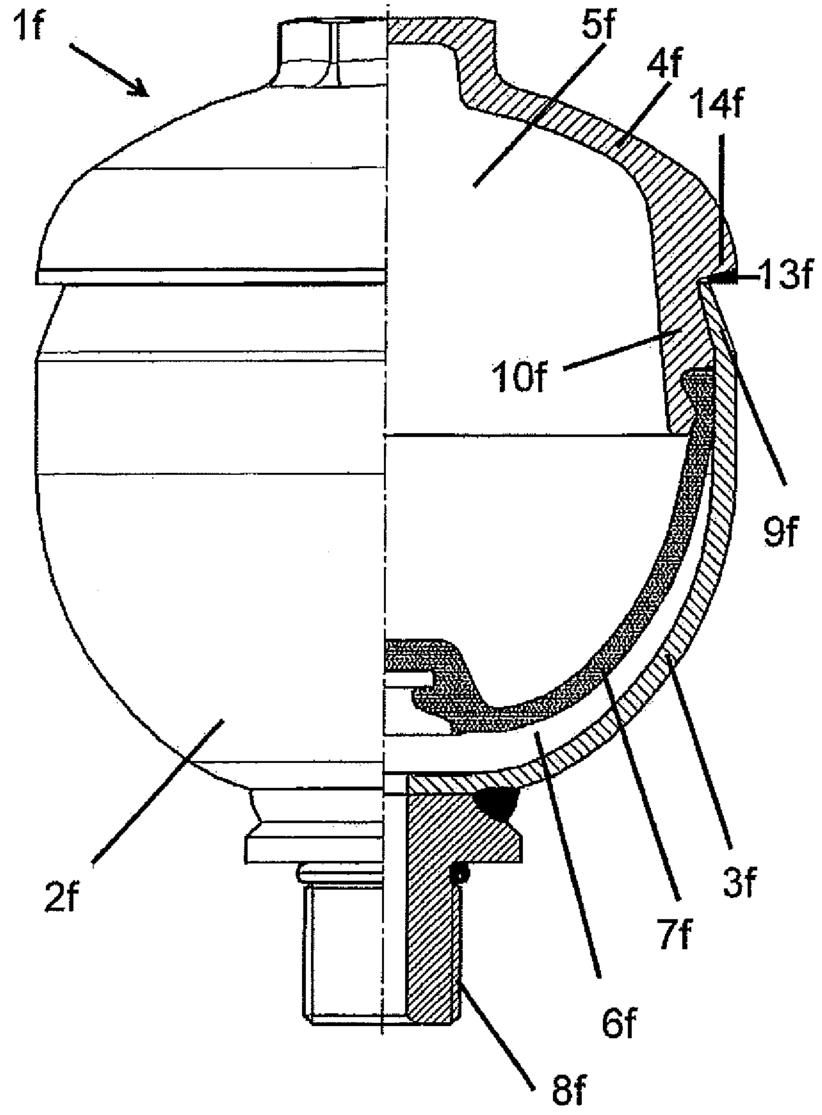
FIG. 6 shows a further hydraulic accumulator which is embodied as a diaphragm accumulator and has two components which are connected to one another with a form fit and/or a material join, wherein the edges of the housing lower shell and of the housing upper shell overlap one another in the joining region, wherein the housing upper shell has an edge with relatively large wall thickness, wherein the housing lower shell engages behind a shoulder in the housing upper shell and bears against an edge seal.

In the drawing, FIG. 6 shows a hydraulic accumulator If comprising a base body 2*f* with a first component 3*f* and a second component 4*f* which are connected to one another by a form fit.

At least one component, specifically the first component 3*f*, is deformed by a contactless shaping method in such a way that it enters into the form fit with the other component 4*f*.

The shaping method which was used to manufacture the form fit is an electromagnetic pulse joining operation.

The first component 3*f* is fabricated from aluminum or steel.

The components 3*f*, 4*f* form a storage space 5*f* for a gaseous medium and a receptacle space 6*f* for a liquid medium, wherein the storage space 5*f* is separated off from the receptacle space 6*f* by a diaphragm 7*f*, and wherein the volumes of the storage space 5*f* and of the receptacle space 6*f* are variable.

The storage space 5*f* is embodied without an inflow line. The receptacle space 6*f* has a connector 8*f* which is integrally formed onto the first component 3*f*.

The first component 3*f* is embodied as a housing lower shell and the second component 4*f* as a housing upper shell, wherein the edges 9*f*, 10*f* of the housing lower shell and of the housing upper shell overlap one another and clamp in the diaphragm 7*f* between them. There is no clamping ring provided for the diaphragm 7*f*. The diaphragm 7*f* projects with a bead in a positively locking fashion into a hollow in the edge 10*f* of the second component 4*f*. The edge 9*f* of the first component 3*f* bears against an edge seal 131 which lies in a stop 14*f* of the second component 4*f*.

The diaphragms shown in FIGS. 1 to 9 are fabricated from an elastomer.

Figure 7:
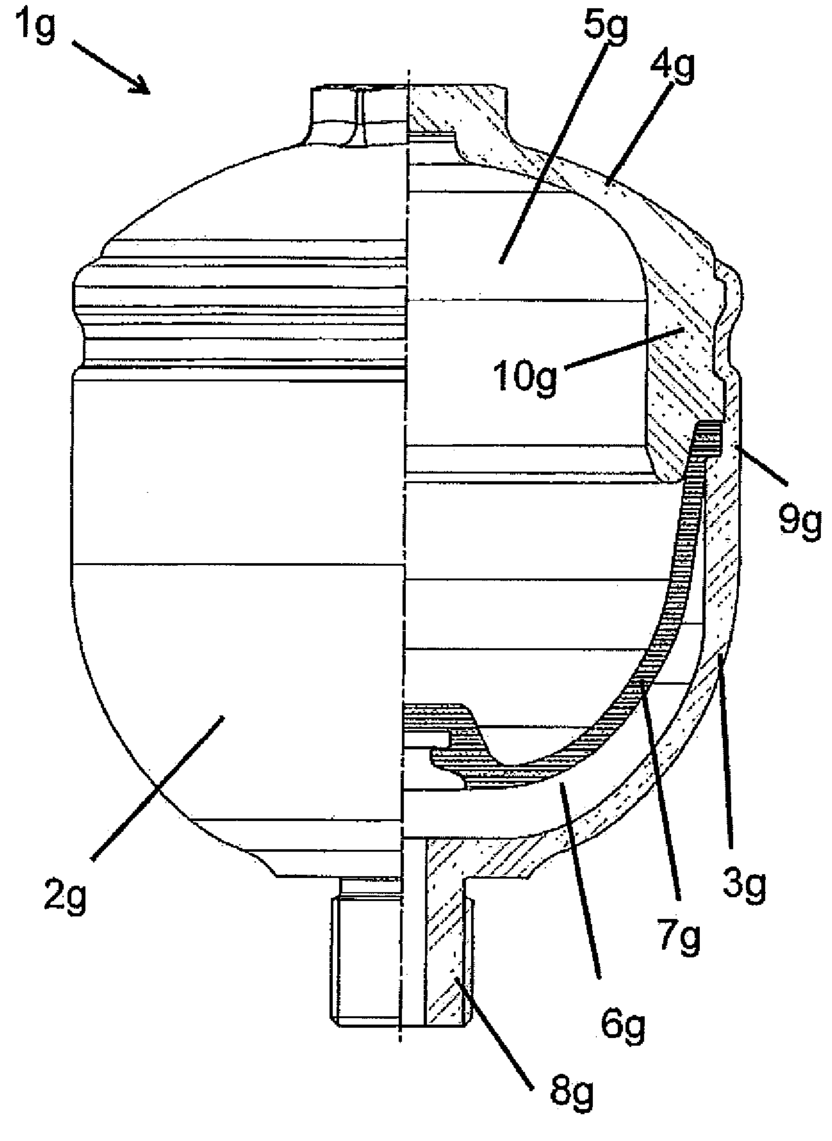
FIG. 7 shows a further hydraulic accumulator which is embodied as a diaphragm accumulator and in which multiple interlocking between the components is implemented.

FIG. 7 shows a hydraulic accumulator 1*g* comprising a base body 2*g* with a first component 3*g* and a second component 4*g* which are connected to one another by a form fit and/or material join.

At least one component 3*g* is deformed by a contactless shaping method in such a way that it enters into the form fit and/or material join with the other component 4*g*. The shaping method is an electromagnetic pulse joining operation.

FIG. 7 illustrates that the components 3*g*, 4*g* are multiply interlocked with one another. Specifically, the edges 9*g*, $\mathbf{10}_g$ are multiply interlocked with one another. In addition to a form fit, the edges 9*g*, 10*g* and/or the components 3*g*, 4*g* could be additionally connected to one another by a material join.

Figure 8:
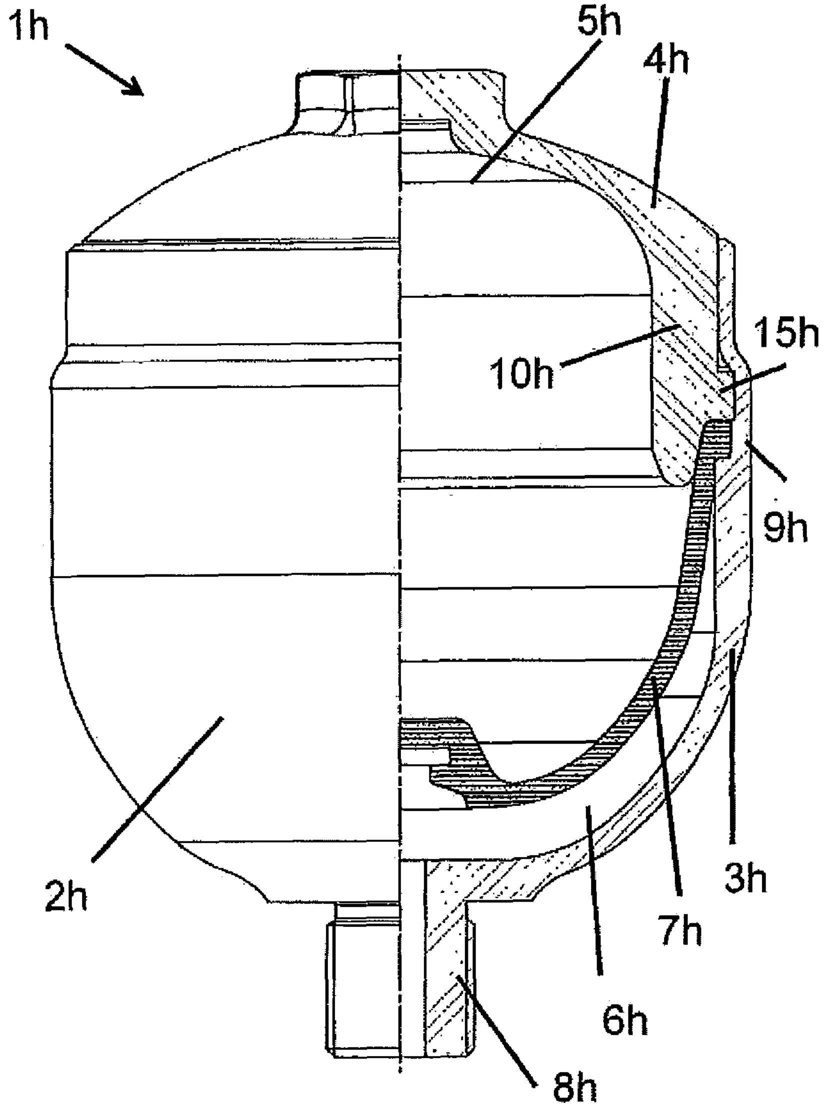
FIG. 8 shows a further hydraulic accumulator which is embodied as a diaphragm accumulator and in which a form fit is implemented by means of a sharp transition between two diameters of a component.

FIG. 8 shows a hydraulic accumulator 1*h* comprising a base body 2*h* with a first component 3*h* and a second component 4*h* which are connected to one another by a form fit and/or material join.

At least one component 3*h* is deformed by a contactless shaping method in such a way that it enters into the form fit and/or material join with the other component 4*h*. The shaping method is an electromagnetic pulse joining operation.

The form fit is produced by a sharp transition between two diameters of the second component 4*h*. The sharp transition is implemented by a step 15*h* which is partially rectangular in cross section. The sharp transition is formed in the edge 10*h* of the second component 4*h*.

In addition to a form fit, the edges 9*h*, 10*h* or the components 3*h*, 4*h* could be additionally connected to one another by a material join.

Figure 9:
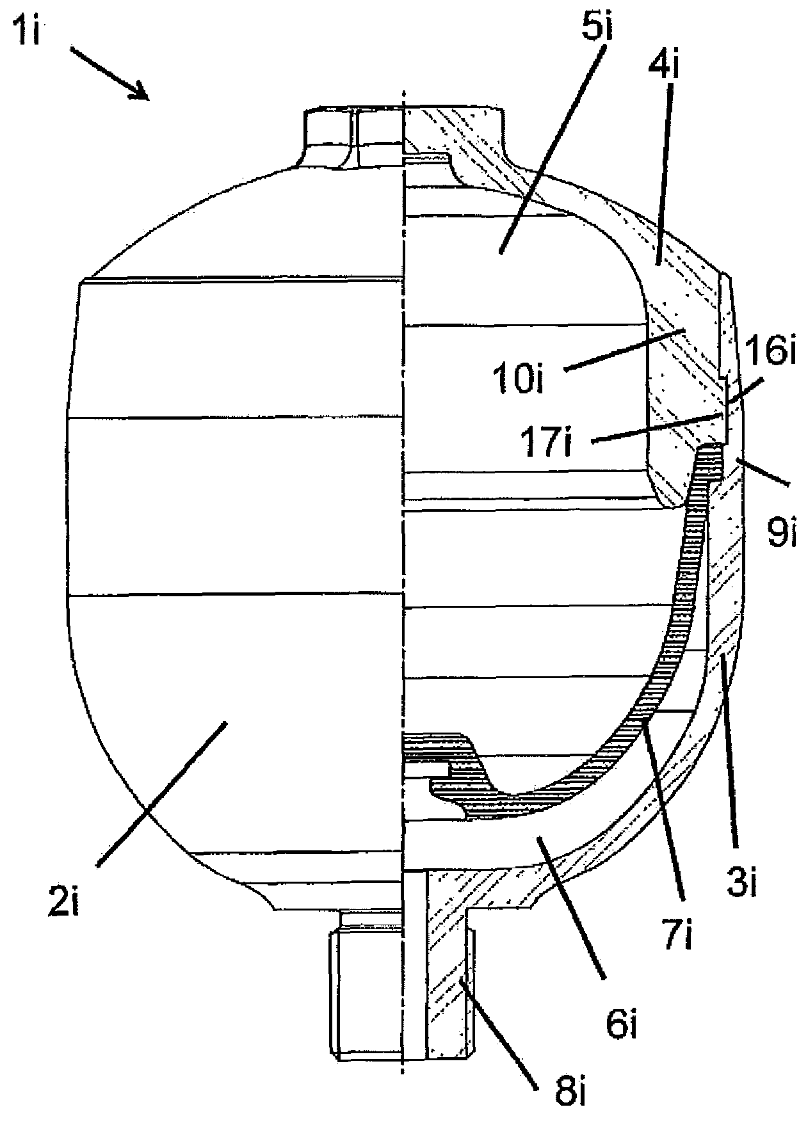
FIG. 9 shows a further hydraulic accumulator which is embodied as a diaphragm accumulator and in which an improved form fit is implemented by a recess.

FIG. 9 shows a hydraulic accumulator 1*i* comprising a base body 2*i* with a first component 3*i* and a second component 4*i* which are connected to one another by a form fit and/or material join.

At least one component 3*i* is deformed by a contactless shaping method in such a way that it enters into the form fit and/or material join with the other component 4*i*. The shaping method is an electromagnetic pulse joining operation.

The form fit is generated by a recess 16*i* which is made in the first component 3*i* or in the edge 9*i* thereof before the pulse joining operation. During the pulse joining operation, the first component 3*i* is fitted with the recess 16*i* onto a projection 17*i* on the second component 4*i* or on the edge 10*i* thereof. This brings about better interlocking of the components 3*i*, 4*i*.

The invention claimed is:

1. A hydraulic accumulator comprising:

a base body having a first component and a second component connected to one another by one of a form fit and a material join, the first component and the second component forming a storage space for a gaseous medium and a receptacle space for a liquid medium, the storage space separated from the receptacle space by a diaphragm, where a volume of the storage space and a volume of the receptacle space are variable, the storage space is embodied without an inflow line, and the storage space includes the gaseous medium at a pressure different from atmospheric pressure;

wherein at least one of the first component and the second component is deformed by contactless shaping in an installation space at a pressure different from atmospheric pressure to join the first component and the second component by the one of the form fit and the material join, the contactless shaping comprising electromagnetic pulse joining, wherein a wave structure is formed in the first component and a plurality of depressions is formed in the second component, the wave structure engaging the plurality of depressions; and wherein the diaphragm is placed under prestress without using a clamping ring by the deforming of the at least one of the first component and the second component.

2. The hydraulic accumulator as claimed in claim 1, wherein the first component and the second component are connected to one another by the material join.

3. The hydraulic accumulator as claimed in claim 1, wherein at least one of the first component and the second component is fabricated from a metal.

4. The hydraulic accumulator as claimed in claim 1, wherein at least one of the first component and the second component is fabricated from a plastic.

5. The hydraulic accumulator as claimed in claim 1, wherein the receptacle space has a connector integrally formed onto the first component.

6. The hydraulic accumulator as claimed in claim 1, wherein the first component is embodied as a housing lower shell and the second component is embodied as a housing upper shell, wherein an edge of the housing lower shell and an edge of the housing upper shell overlap one another and clamp a diaphragm therebetween.

7. The hydraulic accumulator as claimed in claim 1, further comprising a sealing means arranged between the first component and the second component.

8. A method of making a hydraulic accumulator comprising:

deforming one of a first component and a second component by contactless shaping in an installation space at a pressure different from atmospheric pressure to join the first component and the second component by one of a form fit and a material join, the contactless shaping comprising electromagnetic pulse joining;

wherein the first component and the second component are connected to one another by the one of the form fit and the material join to form a base body, the first component and the second component forming a storage space for a gaseous medium and a receptacle space for a liquid medium, the storage space separated from the receptacle space by a diaphragm, where a volume of the storage space and a volume of the receptacle space are variable, the storage space is embodied without an inflow line, the storage space includes the gaseous medium at a pressure different from atmospheric pressure, and wherein the diaphragm is placed under prestress without using a clamping ring by the deforming one of the first component and the second component during the step of deforming one of the first component and the second component to join the first component and the second component by one of the form fit and the material join.

9. The method of claim 8, wherein the first component and the second component are connected to one another by the material join.

10. The method of claim 8, wherein at least one of the first component and the second component is fabricated from a metal.

11. The method of claim 8, wherein at least one of the first component and the second component is fabricated from a plastic.

12. The method of claim 8, wherein the receptacle space has a connector integrally formed onto the first component.

13. The method of claim 8, wherein the first component is embodied as a housing lower shell and the second component is embodied as a housing upper shell, wherein an edge of the housing lower shell and an edge of the housing upper shell overlap one another and clamp the diaphragm therebetween.

14. The method of claim 8, further comprising a sealing means arranged between the first component and the second component.

15. The hydraulic accumulator as claimed in claim 1, wherein a first one of the first component and the second component is deformed by the contactless shaping and overlaps an outer surface of a second one of the first component and second component.

16. The hydraulic accumulator as claimed in claim 1, wherein a first one of the first component and the second component overlaps an outer surface of a second one of the first component and the second component and an edge of the first one of the first component and the second component is bent inwardly towards the second one of the first component and the second component.

17. The hydraulic accumulator as claimed in claim 1, wherein the first component overlaps an outer surface of the second component, the first component having a recess formed on an inner surface thereof engaging a projection formed on the outer surface of the second component.

* * * * *